W. LESEMANN.
GEARING.
APPLICATION FILED JULY 30, 1908.

903,739.

Patented Nov. 10, 1908.

2 SHEETS—SHEET 1.

WITNESSES
L. H. Schmidt
R. A. Stanley

INVENTOR
WILLIAM LESEMANN,
BY Munn & Co.
ATTORNEYS

W. LESEMANN.
GEARING.
APPLICATION FILED JULY 30, 1908.
903,739.
Patented Nov. 10, 1908.
2 SHEETS—SHEET 2.
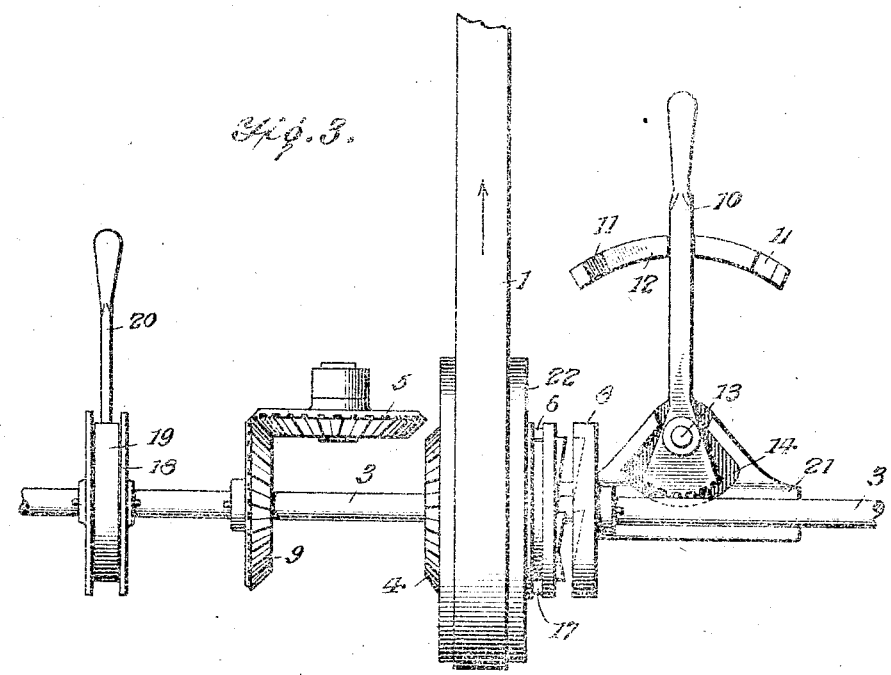
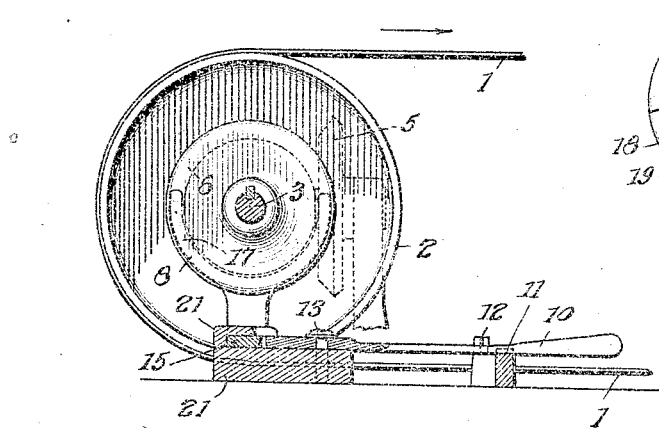
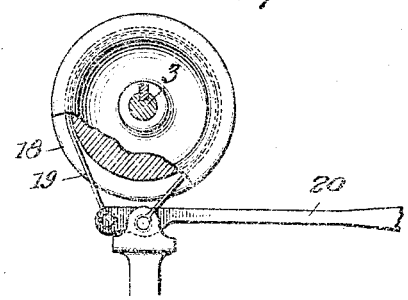
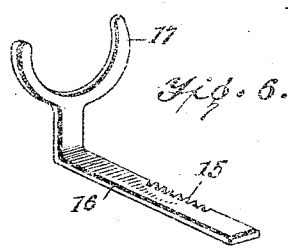
WITNESSES
L. H. Schmidt
R. A. Stanley
INVENTOR
WILLIAM LESEMANN,
BY Munn & Co.
ATTORNEYS.

UNITED STATES PATENT OFFICE.

WILLIAM LESEMANN, OF EGG HARBOR CITY, NEW JERSEY.

GEARING.

No. 903,739.　　　Specification of Letters Patent.　　　Patented Nov. 10, 1908.

Application filed July 30, 1908. Serial No. 446,160.

*To all whom it may concern:*

Be it known that I, WILLIAM LESEMANN, a citizen of the United States, and resident of Egg Harbor City, in the county of Atlantic and State of New Jersey, have invented an Improvement in Gearing, of which the following is a specification.

My invention relates to a reversible gearing in which the drive shaft may be given a forward or a backward rotation by simply moving a lever to the right or to the left. Moreover, by moving the lever to a central point the gearing can be released and the loose pulley on the shaft will then revolve idly.

My invention is illustrated in the accompanying drawings, in which

Figure 1:
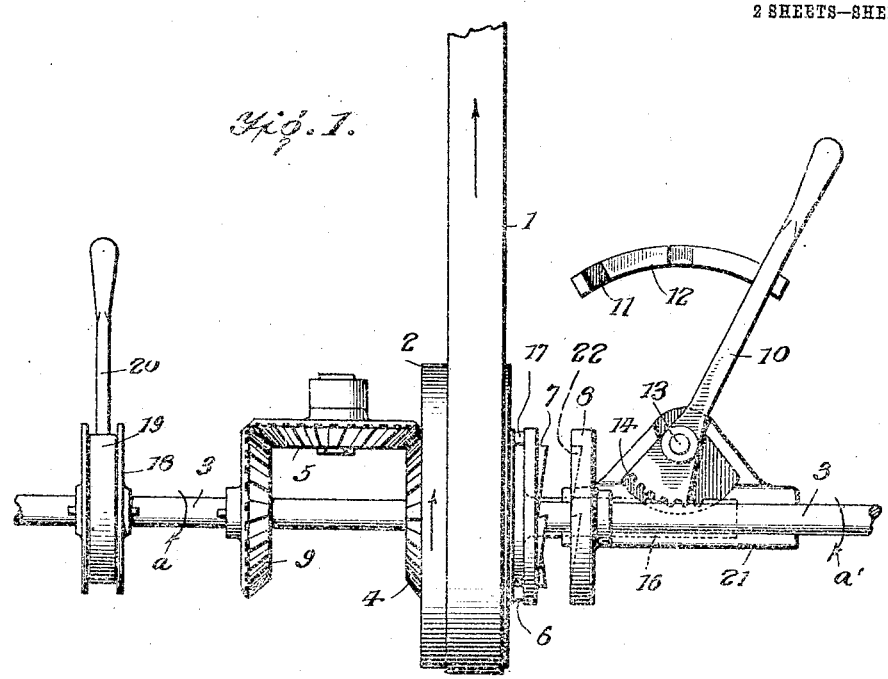
Figure 2:
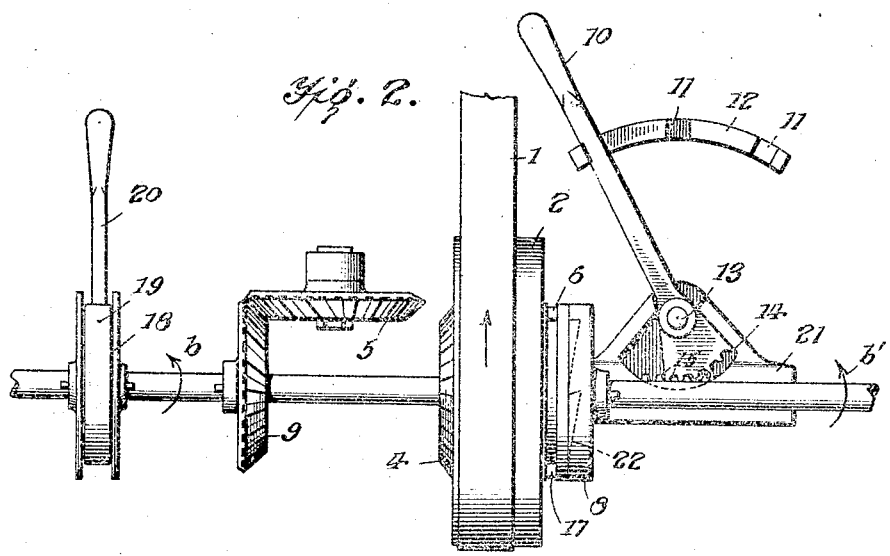

Figure 1 is a view showing one embodiment of my invention with the loose pulley in one operative position. Fig. 2 is a similar view showing the loose pulley in another operative position. Fig. 3 is a view showing the position of the lever when the pulley is idle. Fig. 4 is a detail view of the drive pulley and the operating lever. Fig. 5 is a detail view of the brake mechanism, and Fig. 6 is a perspective view of the shifting means.

Referring now to the drawings, I have shown therein a drive belt 1 arranged to drive a pulley 2, the latter being loosely mounted on a power shaft 3. On one side of the pulley 2 and integral therewith is a bevel gear 4, arranged to mesh with an idle gear 5 and movable towards and from the latter in the manner hereinafter described. On the opposite side of the pulley is a clutch member having an annular groove 6 and provided with a series of teeth 7 arranged to engage the wheel 8, the latter being rigidly secured upon the shaft 3. The bevel gear 5 is in constant engagement with a gear 9 similar to the gear 4 but being secured rigidly to the shaft 3 and facing the gear 4 as shown in the drawings.

In order to shift the loose pulley 2 towards and from the coöperating mechanism on either side thereof, I have provided a shifting lever 10. This lever consists of a bar having a slight spring and adapted normally to rest in the slots 11 of the stop member 12. The lever 10 is pivoted at 13, and is provided on its lower extremity with teeth 14, arranged to mesh with the teeth 15 on the rack 16. The inner end of the rack 16 is turned upwardly and is provided with a semicircular yoke 17 arranged to enter the groove 6 in the clutch member and to move the latter together with the pulley and its gear 4 to the right or to the left accordingly as the lever 10 is shifted to the left or to the right.

On the shaft 3 is secured a wheel 18 having a grooved rim. A band 19 is arranged in this groove and may be brought down into contact with the periphery of the wheel by means of the lever 20.

The pivot 13 of the shifting lever 10 is carried on an extension of the frame 21 in which the rack 16 reciprocates.

The operation of my invention can be easily understood from the above description of the various parts.

Referring now to Fig. 1, it will be seen that with the belt moving in the direction indicated by the arrow the gear 4 will cause the revolution of the gear 5 downwardly on its engaging side, and upwardly on the side engaging the gear 8, there will therefore be a revolution of the shaft 3 in the direction indicated by the curved arrows *a* and *a'*. If now it is desirable to reverse the motion of the shaft the lever 10 is sprung outwardly in order to clear the edges of the slot 11 and is then moved over to the right into the position shown in Fig. 2. This movement of the lever 10 will force the rack member 16 towards the right and the yoke 17 of the rack engaging the loose pulley 2 in the groove 6 will pull the latter longitudinally of the shaft until the teeth 7 of the clutch enter the sockets 22 in the wheel 8. Since the pulley is turning in the direction indicated by the arrow, motion will be imparted to the wheel 8 and consequently to the shaft 3 which will then rotate in the direction shown by the arrows *b b'*, in Fig. 2.

Fig. 3 shows the position of the lever when the device is thrown out of gear. In this position the belt is still traveling in the direction indicated by the arrow. The pulley 2 is however neither in engagement with the bevel gear 5 nor the wheel 8 on the shaft, and consequently revolves idly upon the latter.

In order to provide for the stopping of the rotation of the shaft 3 prior to its rotation in the reverse direction, I make use of the band-brake, first bringing the shaft to a standstill and then moving the lever.

It is obvious that other forms of this device based upon the same idea might be made, but I consider as my own idea and wish to claim, all of the modifications that fairly fall within the spirit of my invention.

What I claim is:

1. A gearing, comprising a rotatable shaft, a pulley loosely mounted thereon, a bevel gear integral with said pulley on one side thereof, an integral clutch member provided with an annular groove and teeth on the other side thereof, a wheel rigidly secured to the shaft and having slots arranged to receive the teeth on said clutch member, a rack provided with a laterally extending yoke arranged to enter said annular groove, a shifting lever having teeth on one end arranged to mesh with teeth on said rack, a bevel gear mounted adjacent to the shaft and having its face parallel thereto, a third bevel gear similar to the first mentioned bevel gear fixedly secured to said shaft and being in constant engagement with said second named bevel gear, and means for retaining said shifting lever in its shifted position.

2. A gearing, comprising a rotatable shaft, a pulley loosely mounted thereon and provided on one side with an integral bevel gear and on the other side with an integral clutch member, means for driving said pulley, a shifting lever adapted to move said loose pulley, a wheel rigidly attached to said shaft and arranged to be actuated by said clutch member, a second bevel gear arranged to be actuated by said first named bevel gear, and a third bevel gear arranged to be actuated by said second named bevel gear and to turn said shaft in a reverse direction.

WILLIAM LESEMANN.

Witnesses:
CHARLES KROEKEL,
LORENZ KREIN.